(12) United States Patent
Kim et al.

(10) Patent No.: US 7,242,919 B2
(45) Date of Patent: Jul. 10, 2007

(54) MULTIMEDIA BROADCAST AND MULTICAST SERVICE PAGING

(75) Inventors: Soeng-Hun Kim, Suwon-shi (KR); Sung-Ho Choi, Suwon-shi (KR); Kook-Heui Lee, Yongin-shi (KR); Shanpeng Xiao, Beijing (CN); Detao Li, Beijing (CN); Chunying Sun, Beijing (CN)

(73) Assignees: Samsung Electronics Co., Ltd. (KR); Beijing Samsung Telecom R&D Center (CN)

( * ) Notice: Subject to any disclaimer, the term of this patent is extended or adjusted under 35 U.S.C. 154(b) by 91 days.

(21) Appl. No.: 10/525,146

(22) PCT Filed: Aug. 14, 2003

(86) PCT No.: PCT/KR03/01650

§ 371 (c)(1),
(2), (4) Date: Oct. 6, 2005

(87) PCT Pub. No.: WO2004/017581

PCT Pub. Date: Feb. 26, 2004

(65) Prior Publication Data

US 2006/0104225 A1 May 18, 2006

(30) Foreign Application Priority Data

Aug. 16, 2002 (CN) .............................. 02 1 30568

(51) Int. Cl.
*H04Q 7/00* (2006.01)

(52) U.S. Cl. ...................... 455/313; 370/312; 370/329; 455/426.1; 455/450; 455/458

(58) Field of Classification Search ................ 370/313, 370/329, 312, 432, 428, 392, 336, 458, 508, 370/338, 390, 437, 465, 335, 331; 455/414.1, 455/412.1, 525, 450, 509, 434, 426.1, 458, 455/414.3–414.4, 511, 452.1, 461, 445
See application file for complete search history.

(56) References Cited

U.S. PATENT DOCUMENTS

2004/0029596 A1* 2/2004 Kim et al. .................. 455/458

(Continued)

FOREIGN PATENT DOCUMENTS

WO    WO 01/86980    11/2001

OTHER PUBLICATIONS

Ravindran et al., "Incorporation of Flow & QOS Control in Multicast Routing Architectures", 1998 IEEE, pp. 312-320.

*Primary Examiner*—Pablo N. Tran
(74) *Attorney, Agent, or Firm*—The Farrell Law Firm

(57) ABSTRACT

This invention provides a paging method for Multimedia Broadcast/Multicast Service in mobile communication system. The paging process and radio resource setup process are merged in this method to try to reduce uplink responses. This invention extends existing PCH IubFP frame structure by adding MBMS Indication bit(MI) to PCH IubFP frame. The PCH IubFP frame includes Paging Indication (PI) and Paging Message. Paging message carries MBMS service information. MBMS Service Identity or MBMS Paging Indicator is added to the reserved 12 bits in Paging Indicator Channel (PICH) frame structure. Radio Network Controller (RNC) transfers Paging Indicator Message and paging message to Base Station (Node B) so as to send over the air-interface.

20 Claims, 12 Drawing Sheets

U.S. PATENT DOCUMENTS

| | | |
|---|---|---|
| 2004/0180675 A1* | 9/2004 | Choi et al. .................. 455/458 |
| 2004/0229605 A1* | 11/2004 | Hwang et al. ............ 455/426.1 |
| 2005/0111395 A1* | 5/2005 | Hwang et al. .............. 370/313 |
| 2005/0118992 A1* | 6/2005 | Jeong et al. ............. 455/422.1 |
| 2005/0153715 A1* | 7/2005 | Hwang et al. .............. 455/458 |
| 2005/0249141 A1* | 11/2005 | Lee et al. ................... 370/312 |
| 2006/0040655 A1* | 2/2006 | Kim ........................ 455/426.1 |
| 2006/0072516 A1* | 4/2006 | Jeong et al. ................ 370/335 |
| 2006/0146858 A1* | 7/2006 | Kim ........................... 370/432 |
| 2006/0274780 A1* | 12/2006 | Walsh et al. ................ 370/458 |
| 2007/0042794 A1* | 2/2007 | Fischer ....................... 455/466 |

* cited by examiner

MULTIMEDIA BROADCAST AND MULTICAST SERVICE PAGING

BACKGROUND OF THE INVENTION

1. Field of the Invention

This invention relates to a method for paging users in mobile communication system, and more particularly to a method of paging users using point-to-multipoint group for multimedia broadcast/multicast service in mobile communication system.

2. Description of the Related Art (1) Basic Operation Process of Existing Paging Paging in existing communication system is a point-to-point user-based paging, whose basic operation process is shown in FIG. 3:

After a mobile terminal is registered in the network, it will be distributed to a paging group. There is a Paging Indicator (hereinafter referred to as PI) 204 for each paging group. When a terminal belonging to a paging group is paged, PI corresponding to this paging group will appear on the Paging indicator Channel (hereinafter referred to as PICH) 202 cyclically.

When the terminal detects its PI on PICH, it will start to receive specific paging message from Secondary Common Control Physical Channel (hereinafter referred to as SCCPCH) 201. In other words, PICH only carries PI information, and paging message is carried by SCCPCH. The explanation for paging message is the upper layer function of User Equipment (UE) protocol.

In order to decrease power consumption, terminal is designed as Discrete Receiving (hereinafter referred to as DRX) mode, i.e. terminal stays in sleep mode when it is in idle mode. In this mode, Terminal will consume less power. Only when terminal detects its PI, terminal will be woken up to receive specific paging message.

PI monitoring by terminal is also cyclical, and the length of the cycle is determined by the network. The larger the cycle is, the less possibly terminal wakes up from sleep, and thus the longer terminal battery standby time will be, but the cost is to reduce the response speed of terminal to network paging.

(2) Frame Structure of Existing PICH

PICH is the pure-physical channel used to carry PI, and has been described in detail in 3 GPP specification TS 25.211 v4.2.0. FIG. 4 shows its frame structure.

The length of a PICH wireless frame is 10 ms, and the frame is composed of 300 bits, in which 288 bits are used to carry PI and the remaining 12 bits are reserved for future use and won't be transmitted. A Paging Indicator (PI) is composed of several bits. According to the different length of PI, a PICH frame can carry 18, 36, 72 or 144 PIs. Np indicates the number of PIs in a PICH frame.

The position of PI in a frame is calculated according to International Mobile Subscriber Identity number (hereinafter referred to as IMSI) of the subscriber, and the calculation method is as follows:

PI=DRX Index mod Np. Wherein DRX Index equals to IMSI div 8192. "mod" indicates the modulus operation, and "div" indicates round-off operation for division.

To guarantee reliable transmission, existing technology deploys the following SFN based sliding mechanism:

$$q = \left(PI + \left\lfloor ((18 \times (SFN + \lfloor SFN/8 \rfloor + \lfloor SFN/64 \rfloor + \lfloor SFN/512 \rfloor)) mod 144) \times \frac{Np}{144} \right\rfloor \right) mod Np$$

In above equation, "q" indicates the actual position of PI in a frame, and SFN is the system frame number, which changes with time. With the change of SFN, the position of PI, i.e. q, will slide. $\lfloor \ \rfloor$ indicates round-off operation and "mod" indicates modulus operation.

"Pq" is used to indicate the value of PI on the position of q. If Pq equals 1, it is indicated that PI is valid and UE shall be woken up to read paging message; if Pq equals 0, it is indicated that PI is invalid and it is unnecessary for UE to be woken up to read paging message. The mapping relation between paging indicator Pq, and PICH is shown in following table (Table 1):

TABLE 1

Mapping relation between paging indicator $P_q$ and PICH bits Number of PIs in each frame (Np)

| Pq = 1 |
| Pq = 0 |
| Np = 18 |
| {b16q, . . ., b16q + 15} = {−1, −1, . . ., −1} |
| {b16q, . . ., b16q + 15} = {+1, +1, . . ., +1} |
| Np = 36 |
| {b8q, . . ., b8q+7} = {−1, −1, . . ., −1} |
| {b8q, . . ., b8q+7} = {+1, +1, . . ., +1} |
| Np = 72 |
| {b4q, . . ., b4q+3} = {−1, −1, . . ., −1} |
| {b4q, . . ., b4q+3} = {+1, +1, . . ., +1} |
| Np = 144 |
| {b2q, b2q+1} = {−1, −1} |
| {b2q, b2q+1} = {+1, +1} |

It is seen from Table 1 that when Pq=1, all bits composing the PI shall be set as '−1' and when Pq=0, those shall be all set as '+1'.

(3) Frame Structure of Existing PCH IubFP

Since paging is initiated by the network, paging information must be transferred to the air interface via proper mode for the convenience of receiving by terminal. FIG. 5 shows the frame structure of existing PCH's Node B and Radio Network Controller interface frame protocol (hereinafter referred to as PCH IubFP). PCH IubFP is used to transfer paging information between base station (hereinafter referred to as Node B) and Radio Network Controller (hereinafter referred to as RNC). 3 GPP specification TS25.435 v4.2.0 has given detailed description for existing PCH IubFP frame structure.

PCH IubFP frame includes PI information and paging message. To page a UE, two continuous PCH IubFP frames will be used. The first frame includes PI information and the second includes paging message. Descriptions for the components shown in FIG. 5 are as follows:

Paging Indicator (PI)

Description: Indicate whether this frame has PI-bitmap or not.

Value range: {0=the absence of PI-bitmap; 1=the presence of PI-bitmap }.

Field length: 1 bit

PI bitmap (PI-bitmap)

Description: Indicate the bitmaps of $PI_0 \ldots PI_{N-1}$. The $7^{th}$ bit of the first byte includes $PI_0$, and the $6^{th}$ bit includes $PI_1$; The $7^{th}$ bit of the second byte includes $PI_8$, and so on.

Value range: {18, 36, 72, 144 PIs.}.

Field length: 3, 5, 9, or 18 bytes (4) Flow of Existing Paging and Radio Bearer Setup 3 GPP specification TS 23.846 v1.1.0 describes the MBMS service paging and radio bearer setup process. FIG. 6 shows the signalling flow of paging and radio bearer setup. Detailed descriptions for each step of the flow are given in the following.

601 BM-SC sends data to SGSN via GGSN.

602 SGSN sends "MBMS notification" to UTRAN to indicate that a certain MBMS service will be started.

603 UTRAN sends "MBMS notification" to UE in MBMS service area.

604 UTRAN sends a "MBMS service request" message to SGSN to request service.

605 and 606 establish radio access bearer (hereinafter referred to as RAB) between UTRAN and SGSN.

607 UE that has activated MBMS service sends a "MBMS radio request" message to the network after receiving "MBMS notification".

608 UTRAN establishes radio bearer (hereinafter referred to as RB) over the air-interface and sends a "MBMS radio allocation" message to UE.

609 After all radio resources are established successfully, data transfer can be performed.

610 Release all network resources after finishing data transmission.

According to FIG. 6, paging process 603 and radio bearer setup process 608 are performed independently.

(5) Existing Paging Message

In 3 GPP specification TS25.331 v4.2.0, existing paging message is called "Paging Type 1". When UE needs to be paged, Radio Network Controller (hereinafter referred to as RNC) sends "Paging Type 1" message to UE via base station (hereinafter referred to as Node B).

This message includes information on following several aspects:

Paging record list listing the identity of UE that is paged by the message.

Broadcast Control Channel modification info (BCCH modification info) representing Modification indication for system broadcast information.

One paging message can include paging records for multiple UEs, which are known as "Paging record". Paging Record (Paging Record) includes following several parameters:

Paging cause representing the cause of initiating the paging. At present, causes listed in the specification are as follows:

Conversational Call (Terminating Conversational Call)

Streaming Call (Terminating Streaming Call)

Interactive Call (Terminating Interactive Call)

Background Call (Terminating Background Call)

High Priority Signalling (Terminating High Priority Signalling)

Low Priority Signalling (Terminating Low Priority Signalling)

Cause Unknown (Terminating—cause unknown)

UE Identity (UE Identity) representing the identity of UE, which can be International Mobile Subscriber Identity (IMSI), Temporary Mobile Subscriber Identity (TMSI), Packet-Temporary Mobile Subscriber Identity (P-TMSI), UE-Radio Network Temporary Identity (U-RNTI), etc. UE confirms self-paging through checking the UE identity.

SUMMARY OF THE INVENTION

The paging technology in existing mobile communication system is point-to-point paging based on UE and must page for every user of the service one-by-one, which will not only waste radio resources but also result in extremely low efficiency of paging. Thus, considering the above problem of paging technology in existing mobile communication system, this invention provides a method of paging users using point-to-multipoint group for MBMS in mobile communication system on the basis of existing paging mechanism. All users utilizing the service can be paged at the same time through point-to-multipoint paging and radio resources sharing, which can effectively make use of radio resources and improve paging efficiency.

In addition, existing paging process and radio resource setup process are performed separately. While in MBMS service, since users receiving the same kind of service are very centralized, a large number of users will request network accessing in one paging and service setup process, which will result in uplink congestion from the terminal to the network. In order to reduce this kind of congestion, this invention provides a paging method for combining the paging process and the radio resource setup process to try to reduce uplink response.

In addition, in order to provide paging mode for MBMS based on existing paging mechanism, this invention also designs a paging message that can carry MBMS service parameters; Adds MBMS Service Identity number to the reserved 12 bits of PICH frame structure; and extends existing PCH IubFP frame structure to send paging information (including PI information and paging message) from RNC to Node B so that it can be transferred over the air-interface.

According to the invention, a method of paging UEs to provide MBMS service in mobile communication system, the method comprises steps of:

(a) Broadcast and multicast service center (BM-SC) sending data to Service GPRS Supporting Node (SGSN) via Gateway GPRS Supporting Node (GGSN);

(b) After Service GPRS Supporting Node (SGSN) receives data from Gateway GPRS Supporting Node (GGSN), it sending MBMS notification to Radio network controller (RNC);

(c) After RNC receives the notification from SGSN, it organizing the frame according to a paging channel (PCH) Iub frame protocol (FP) according to the notification, wherein the frame includes a MBMS Indicator bit (MI) to the frame of the frame protocol (PCH IubFP), which includes MBMS PI and paging message;

(d) Radio Network Controller (RNC) sending the frame of frame protocol (PCH IubFP) to Base Station (Node B); and (f) Base Station (Node B) transmitting a Temporary MBMS Group Identity (MBMS TMGI) or MBMS Paging Indicator (PI) to by using the last 12 bits of a paging indicator channel (PICH) and Secondary Common Control Physical Channel (SCCPCH) frame that carries paging message for User Equipment (UE).

And according to another aspect of the invention, the method of providing MBMS paging for UE in mobile communication system includes following steps:

(a) Broadcast and Multicast Service Center (BM-SC) sends data to Service General Packet Radio Service Supporting Node (SGSN) via Gateway General Packet Radio Service Supporting Node (GGSN);

(b) After receiving data sent from GGSN, SGSN sends a MBMS notification to Radio Network Controller (RNC);

(c) After receiving the notification from SGSN, RNC organizes the frame of Paging Channel RNC and node interface frame protocol (PCHIubFP) according to the content of the notification, and adds MBMS indication bit (MI) to the PCHIubFP frame, which includes PI and paging message of MBMS service. The paging message carries the service information of MBMS service;

(d) RNC sends the PCHIubFP frame to Node B;

(e) After receiving the frame of the frame protocol (PCHIubFP), Node B firstly examines the MBMS indication bit (MI) of the frame of the frame protocol (PCHIubFP) received. If MI equals 0, it indicates that the frame of the frame protocol (PCHIubFP) belongs to conventional paging; if MI equals 1, it indicates that the frame of the frame protocol (PCH IubFP) includes MBMS service information;

(f) Node B reads PI to construct PICH and makes use of the last 12 bits reserved in PICH to carry Temporary MBMS Group Identifier (MBMS TMGI) or MBMS PI;

(g) Node B reads MBMS paging message to construct Secondary Common Control Physical Channel (SCCPCH) that carries MBMS paging message.

(h) Base Station (Node B) sends Paging Indicator Channel (PICH) frame that carries PI and Secondary Common Control Physical Channel (SCCPCH) frame that carries paging message for User Equipment (UE) to read;

(i) UE firstly examines PICH. If UE has activated MBMS service, it reads the last 12 bits of PICH to determine if the current paging service is what it needs; if the service matches, UE then reads SCCPCH to acquire MBMS paging message;

(j) If the paging message received by UE includes radio bearer parameters, UE establishes radio bearer during paging process; otherwise, UE doesn't establish radio bearer during paging process.

In addition, after the above step (j), UE decides to whether it should send a paging response message to the network according to the requirements of the system or not.

In addition, MBMS PI-bitmap is included in the PI in the above step (c), and MBMS Indicator (MI) and the MBMS PI-bitmap are placed in the reserved part and the extensible part of the frame structure of the frame protocol (PCHIubFP) respectively. Alternatively, MBMS Group Identity mask (TMGI mask) is included in the PI described in the above step (c), and MBMS Indicator (MI) and the MBMS TMGI mask are placed in the reserved part and the extensible part of the frame structure of the frame protocol (PCHIubFP) respectively. Further alternatively, MBMS Indicator (MI) described in the above step (c) is placed in the reserved part of the frame structure of the frame protocol (PCHIubFP).

For PICH frame structure, the last 12 bits reserved for future use by prior art can be used to carry MBMS Service Identity TMGI. There are three kinds of usage modes for these 12 bits. The first mode is to divide the reserved 12 bits in the Paging Indicator Channel (PICH) into Nm groups and the number of groups Nm can be either fixed or variable. The value of Nm can be 1, 2, 3, 4, 6, or 12; each group stores a MBMS Paging Indicator (MPI). Each Temporary MBMS Group Identity (TMGI) described will obtain a MBMS Paging Indicator (MPI), whose calculation method is: MPI= (TMGI div 8192) mod Nm. wherein "MPI" is the MBMS Paging Indicator represented by each group described, and TMGI indicates Temporary MBMS Group Identity (TMGI), "Div" indicates round-off operation for division, and "mod" indicates modulus operation. The second mode is to divide the reserved 12 bits of Paging Indicator Channel (PICH) into m MBMS Paging Groups (MPG) and the number of groups m can be either fixed or variable. The value of m can be 1, 2, 3, 4, 6, or 12; each group stores a MBMS Group Identity mask (TMGI mask). The calculation method for group identity mask is: TMGI mask=TMGI mod $(2^{12/m})$. The calculation method for the group position of TMGI mask in 12 bits is: i=TMGI mod m, wherein TMGI indicates Temporary MBMS Paging Indicator, and TMGI mask indicates Temporary MBMS Group Identity (TMGI) mask. "mod" indicates modulus operation and "i" indicates group position. The third mode is to select several bits from the reserved 12 bits of Paging Indicator Channel (PICH) to be used as MBMS Paging Indicator (MPI).

For paging message of MBMS service information, this invention provides two schemes for MBMS paging message.

The first scheme is to modify existing "Paging Type 1" message, i.e. add a new element "Terminating MBMS Call" to the definition of "Paging Cause" of existing paging message "Paging Type 1"; add a new element "Temporary MBMS Group Identity (MBMS TMGI)" to the definition of "UE Identity" of existing paging message "Paging Type 1"; Paging message "Paging Type 1" can include MBMS Service Identity (MBMS Service ID); Paging message "Paging Type 1" can also include Response Indicator and Activation time.

Another scheme is to design a new paging message called "MBMS Paging", which can include information on following several aspects:

MBMS Service Identity (MBMS TMGI);
MBMS Service Identity. (MBMS Service ID);
Response Indicator (Response Indicator);
Activation time (Activation time).

In addition, the above two kinds of paging also include radio bearer parameters, which can include: Radio Bearer information (RB info), Transfer Channel information (TRCH info), Physical Channel information (PhyCH info), Code information (Code info), Transfer Format Set (TFS), Transfer Format Combination Set (TFCS) and Activation time.

In this invention, UE adopts discrete receiving mode to receive MBMS paging, which can reduce power consumption of terminal. In addition, MBMS paging proposed by this invention makes use of existing discrete receiving cycle (in each cycle, UE is woken up to read PICH channel) and no new discrete receiving cycle for MBMS is designed. So woken-up times of UE hasn't been increased. Therefore, the power consumption of UE is reduced, and the standby time of UE is extended.

MBMS paging in this invention is service-based group paging of point-to-multipoint, which improves paging efficiency and radio resources utilization rate and avoids paging channel congestion.

This invention makes full use of paging resources in existing system and re-designs PICH frame structure, PCH IubFP frame structure as well as paging message, which has no effect on existing paging and enables the system to have the backward compatibility.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the attached drawing.

Multimedia Broadcast/Multicast Service (hereinafter referred to as MBMS) is a new service proposed and being standardized by $3^{rd}$ Generation Partnership Project (hereinafter referred to as 3 GPP). MBMS service is a unidirectional point-to-multipoint (p-t-m) service. Its most remarkable characteristic is that it can make use of radio resources and network resources efficiently.

MBMS service has two modes, i.e. multicast and broadcast. The difference between multicast and broadcast exists in that before receiving multicast service, it is necessary to subscribe in advance from service provider, join relevant multicast group, and the reception of multicast service needs to be paid. Before the system sends multicast or broadcast service, paging is needed to notify user of the service that will be provided right away.

This invention is used to page User Equipment (hereinafter referred to as UE) in Multimedia Broadcast/Multicast Service's MBMS.

Figure 1:
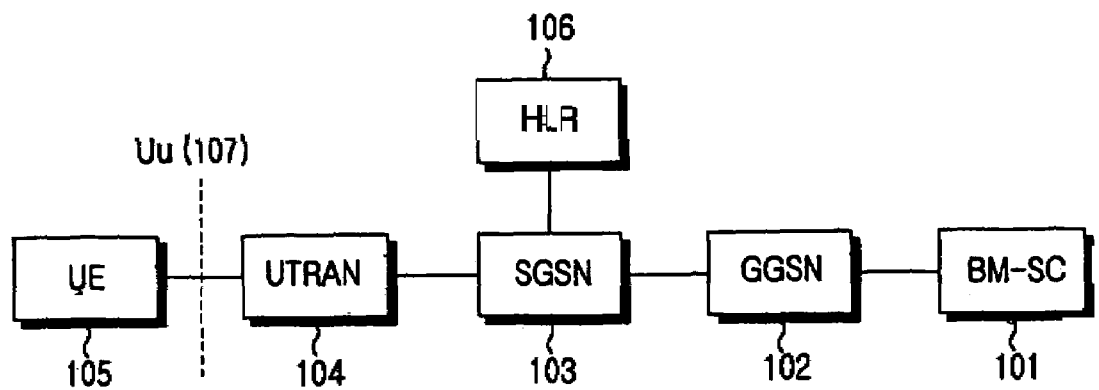
FIG. 1 is a schematical view illustrating of MBMS system structure.

The system structure of MBMS is described below with reference to FIG. 1.

MBMS network structure is based on the core network of General Packet Radio Service (hereinafter referred to as GPRS) and is added some new network elements. Broadcast and multicast service center (hereinafter referred to as BM-SC) 101 is the service control center of MBMS system. Gateway GPRS Supporting Node (hereinafter referred to as GGSN) 102 and Service GPRS Supporting Node (hereinafter referred to as SGSN) 103 compose the transmission network of MBMS service and provide route for data transfer. Home Location Register (hereinafter referred to as HLR) 106 saves the data related to the user and can provide services like user's authentication. UMTS Terrestrial Radio Access Network (hereinafter referred to as UTRAN) 104 provides radio resources for MBMS service over the air-interface. Uu 107 indicates the radio interface between terminal and access network. User Equipment (hereinafter referred to as UE) 105 is the terminal device used to receive data. Radio resources used by MBMS service are not dedicated for one user, but are shared by all users using this service.

Figure 2:
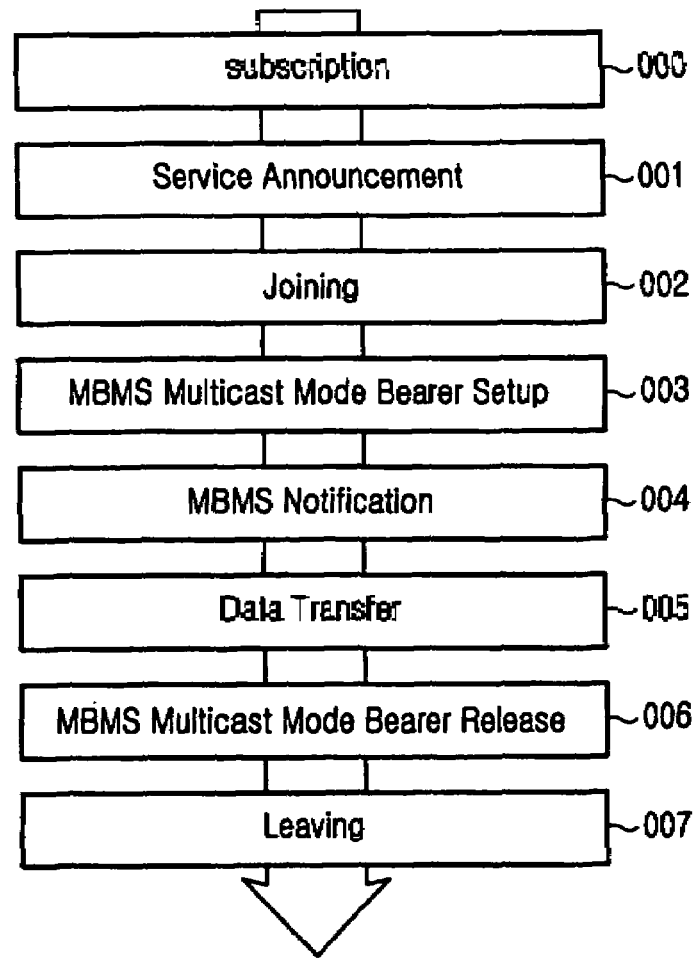
FIG. 2 is a flow chart illustrating MBMS multicast service.
Figure 3:
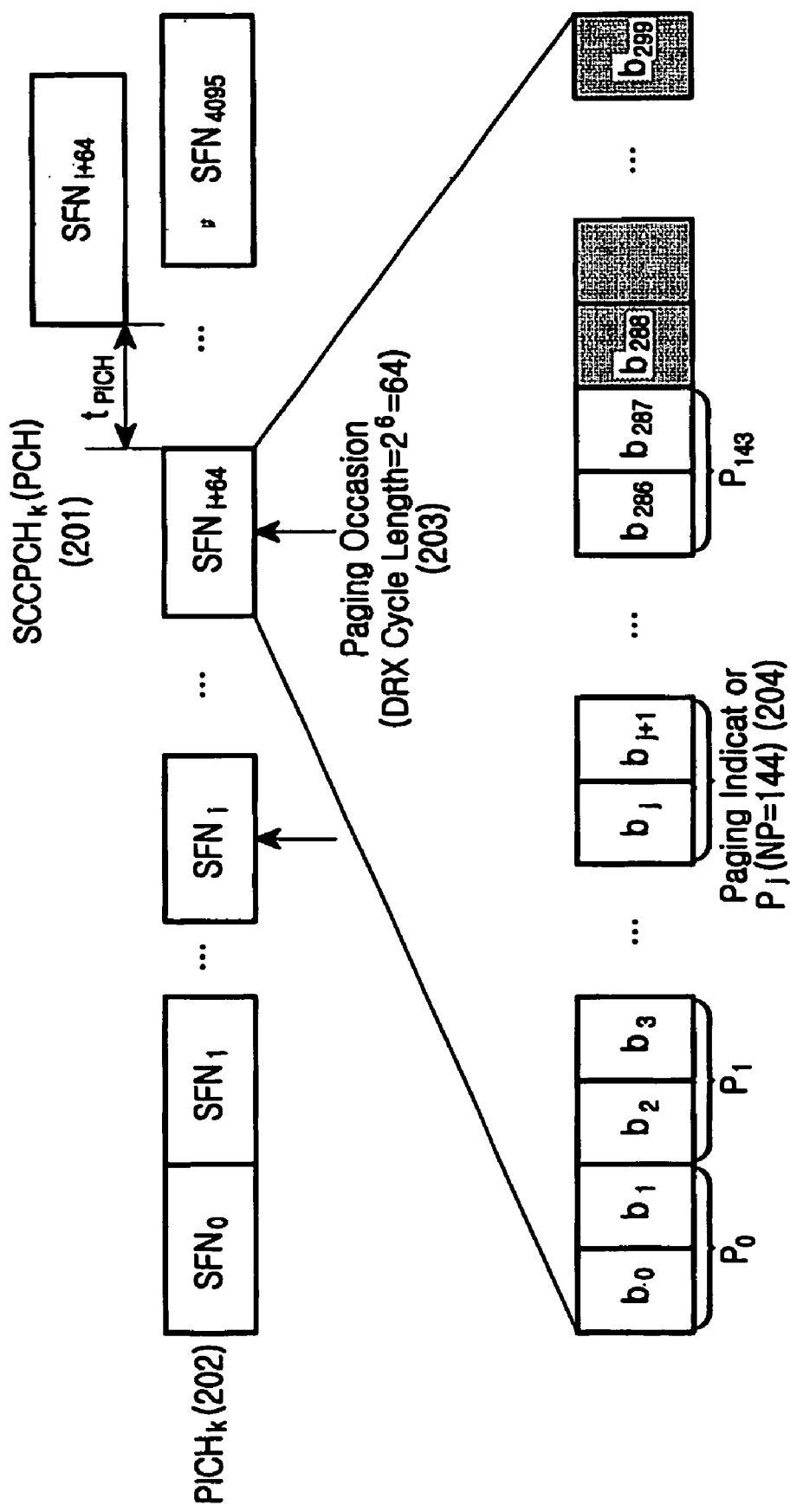
FIG. 3 is a schematical view illustrating paging process according to prior art.
Figure 4:
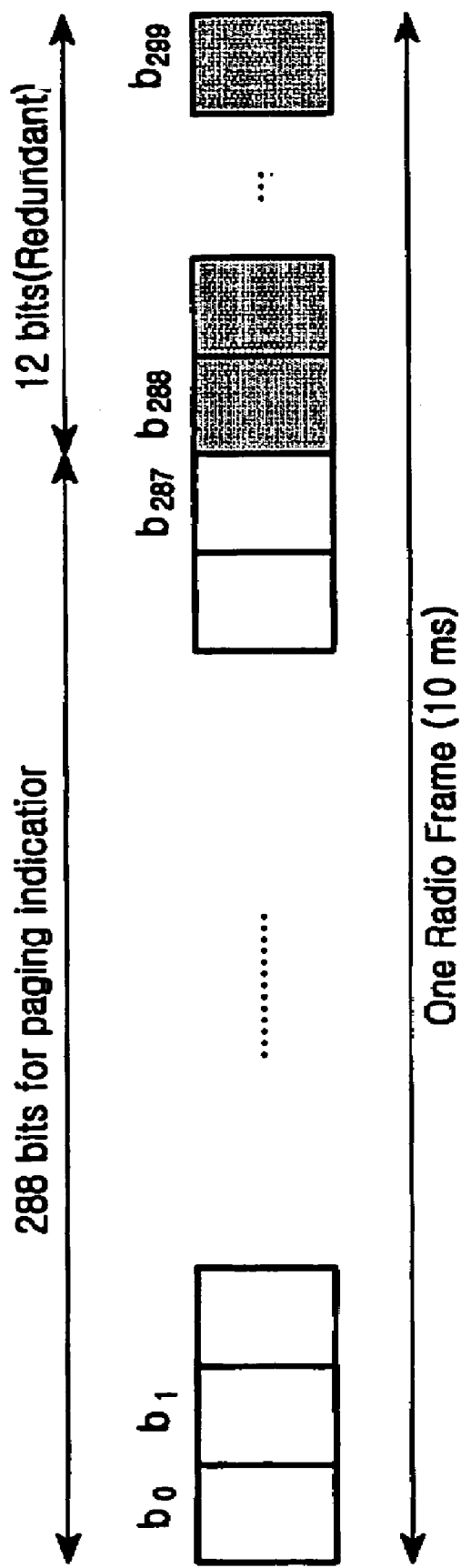
FIG. 4 is a structure diagram illustrating PICH frame structure according to prior art.
Figure 5:
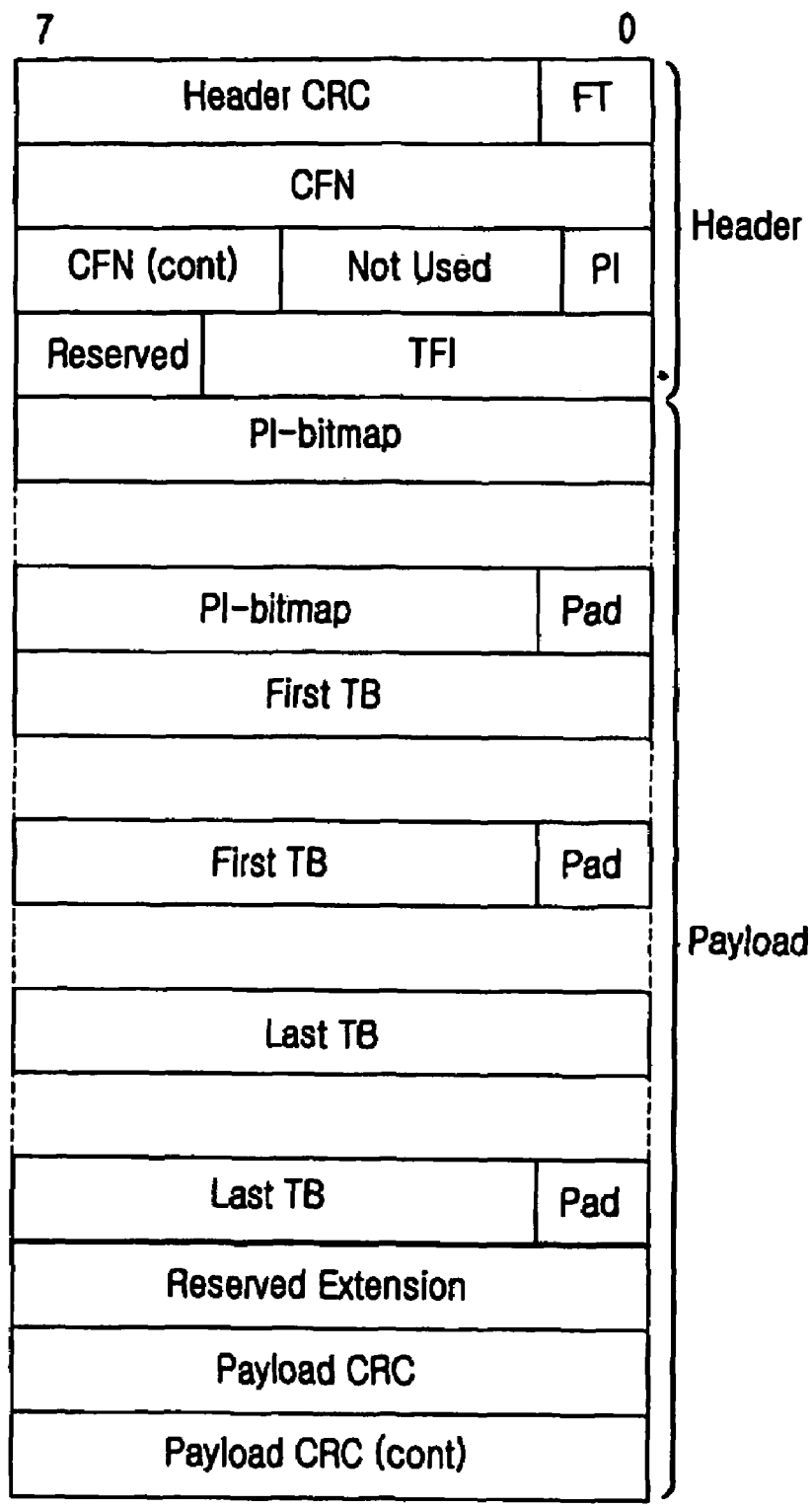
FIG. 5 is a diagram illustrating PCH IubFP frame structure according to prior art.
Figure 6:
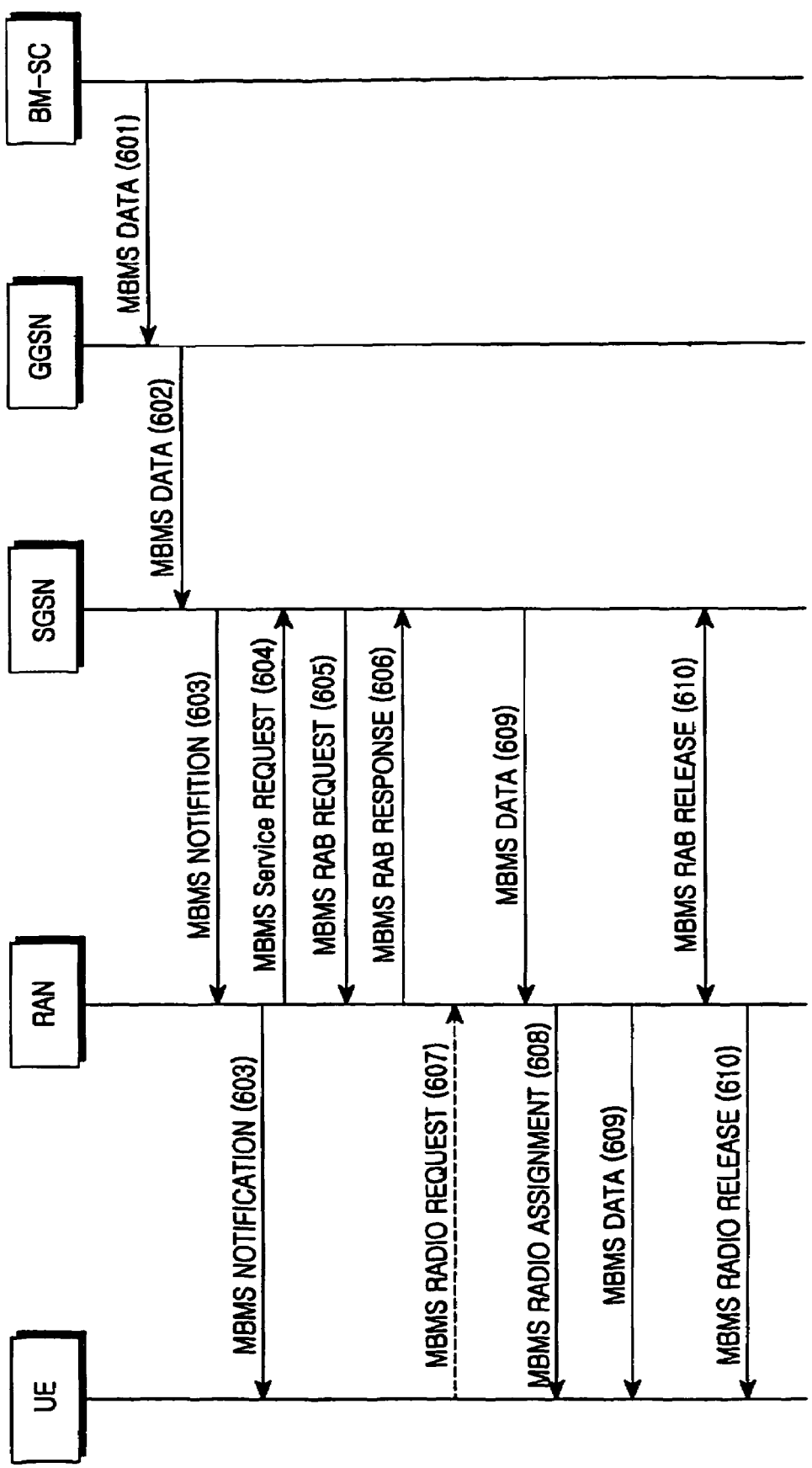
FIG. 6 is a diagram illustrating paging process and radio bearer setup process according to prior art.

MBMS multicast service flow is described below with reference to FIG. 2.

Firstly, in the step of S000 "Subscription", establish the relationship between user and service provider. Authorized user can receive related MBMS service. Then, in the step of S001 "Service advertisement", service provider notifies user of the service that will be provided. For example, the system will rebroadcast a football match in the urban district of Beijing at 7:00 p.m. If the user is willing to receive the service that will be provided by the service provider, then in the step of S002 "joining", user desire to joins a group, i.e. the user informs the network that he or she is willing to receive this multicast service. In the step of S003 "MBMS multicast mode bearer setup", establish network resources for MBMS data transfer. Then in the step S004 "MBMS notification", notify user of MBMS data transfer that will be performed right away. In the step of S005 "data transfer", indicate the process of transferring MBMS service data to user. In the step of 006 "MBMS multicast bearer release", indicate to release network resources after MBMS service data transfer have been performed. The "leaving" step of S007 corresponds to the "joining" step of S002, It is indicated that a user is leaving a group, i.e. the user doesn't want to receive the data of a certain service any more.

This invention emphasizes on the research of 004 "MBMS notification" process; which is called as "Multimedia Broadcast/Multicast Service Paging (MBMS paging)" in this invention.

Figure 12:
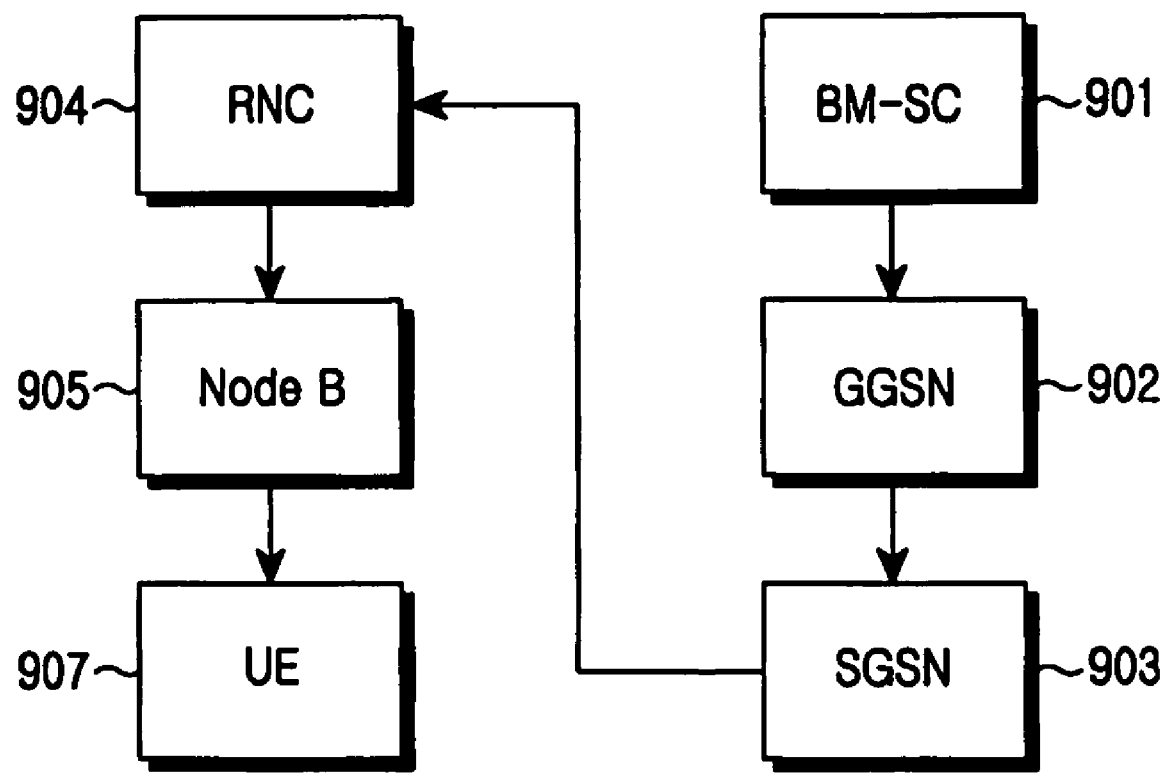
FIG. 12 is a flow chart illustrating MBMS service process.

UE paging flow used for MBMS service of this invention is described below with reference to FIG. 12.

First, BM-SC901 sends data to SGSN903 via GGSN902.

Then, after SGSN903 receives data from GGSN902, it sends MBMS Notification to Radio Network. Controller 904 (hereinafter referred to as RNC) to inform the relevant MBMS service information.

Subsequently, after RNC904 receives MBMS Notification from SGSN, it organizes the frame of Paging Channel & Radio Network Controller and Node B Interface Frame Protocol (hereinafter referred to as PCHIubFP) according to the content of the notification, i.e. add MBMS Indicator bit (MI) in PCHIubFP frame. PCHIubFP frame includes MBMS PI and Paging Message. Paging Message carries MBMS Service Information. After organizing PCHIubFP frame, RNC904 sends PCHIubFP frame to Base Station 905 (Node B).

After Node B receives the frame of PCHIubFP, it firstly examines the MBMS indication bit (hereinafter referred to as MI) of the PCHIubFP frame received. If MI equals 0, it indicates that the PCHIubFP frame belongs to conventional paging; if MI equals 1, it indicates that the PCHIubFP frame includes MBMS service information;

Base Station 905 reads PI to construct Paging Indicator Channel (hereinafter referred to as PICH) and makes use of the last 12 bits reserved in PICH to carry Temporary MBMS Group Identifier (hereinafter referred to as TMGI) or MBMS PI; Base Station 905 (Node B) reads MBMS paging message to construct Secondary Common Control Physical Channel (SCCPCH) to carry MBMS paging message. Then, Base Station 905 (Node B) sends Paging Indicator Channel frame that carries PI and Secondary Common Control Physical Channel (SCCPCH) frame that carries paging message for User Equipment (UE) 907 to read.

UE 907 firstly examines PICH. If UE has activated MBMS service, it reads the last 12 bits of PICH to determine if the current paging service is what it needs; if the service matches, UE907 then reads SCCPCH to acquire MBMS paging message.

If RNC can determine radio bearer parameters before service paging, it can add them into MBMS paging message to realize the combination of paging process and radio bearer setup process.

According to the number of users, radio bearer parameters have two kinds, i.e. point-to-multipoint radio bearer and point-to-point radio bearer. If the number of users is large, point-to-multipoint radio bearer is deployed; otherwise, point-to-point radio bearer is deployed. There, are multiple kinds of modes for RNC to determine radio bearer parameters, e.g. default point-to-multipoint radio bearer or RNC acquiring information on user's number from other channels.

After UE receives paging message, it can set up corresponding radio resources according to radio bearer parameters in the message and does not need to perform the radio bearer setup process again in subsequent processes, which simplifies the signalling flow.

In addition, radio bearer parameters can include: Radio Bearer Information (RB info), Transfer Channel Information (TRCH info), Physical Channel Information (PhyCH info), Code Information (Code info), Transfer Format Set (TFS), Transfer Format Combination Set (TFCS) and Activation Time.

Moreover, UE determines whether to send response message to Radio Network Controller (RNC) or not according to the requirements of paging message. If paging message requires sending response message to RNC, User Equipment UE sends paging response to RNC; otherwise, UE won't. do so.

If BM-SC demands RNC to send back paging response, RNC sends it to Broadcast and Multicast service Center (BM-SC) via SGSN and GGSN; Otherwise, RNC won't do so.

PCH IubFP frame structure

To support MBMS paging, this invention proposes three schemes for PCH IubFP frame structure, which respectively correspond to three schemes of Paging Indicator Channel (PICH) frame structure that will be described in the following.

Scheme 1

Figure 10:
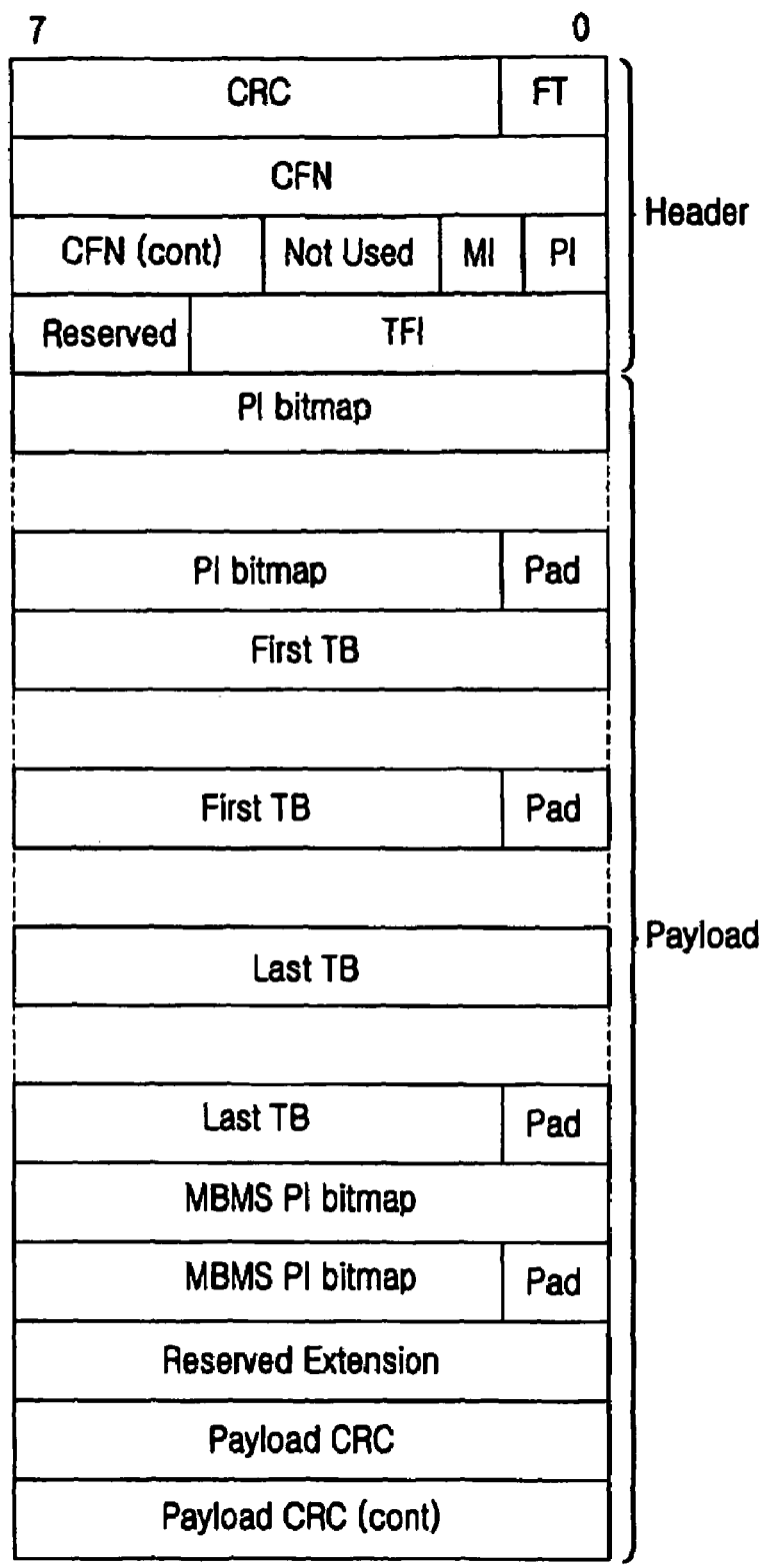
FIG. 10 is a diagram illustrating the PCH IubFP frame structure of according to the first scheme.

Refer to PCH IubFP frame structure of Scheme 1 illustrated in FIG. 10, which corresponds to Scheme 1 of PICH frame structure that will be described later. Add MBMS service related information into the reserved part of frame structure.

In the frame structure of this scheme, MBMS Indicator MI bit and MBMS PI-bitmap are added. MI indicates whether there is MBMS PI-bitmap in payload or not. On account of backward compatibility of the system, MBMS PI-bitmap is placed in the extension part of payload in the frame structure.

MI and MBMS PI-bitmap will be described below in detail.

MBMS Indicator (MI)

Description It indicates that whether there exists MBMS PI bitmap in the payload or not.

Value range: {0=the absence of MBMS PI bitmap in the payload; 1=the presence of MBMS PI bitmap in the payload}

Field Length 1 bit

MBMS PI-bitmap (MBMS PI-bitmap)

Description MBMS PI-bitmaps of $PI_0 \ldots PI_{Nm-1}$. The $7^{th}$ bit of the first byte represents $MBMS PI_0$, and the $6^{th}$ one represents $MBMS PI_1, \ldots$, the $0^{th}$ bit represents $MBMS PI_7$. The $7^{th}$ bit of the second byte represents $MBMS PI_8, \ldots$; the $3^{rd}$ bit represents $MBMS PI_{11}$. Here MBMS PI corresponds to MPI in the first scheme of PICH frame structure described later.

Value range: {1, 2, 3, 4, 6 or 12 MBMS PIs}
Field Length 2 bytes

Scheme 2

Figure 11:
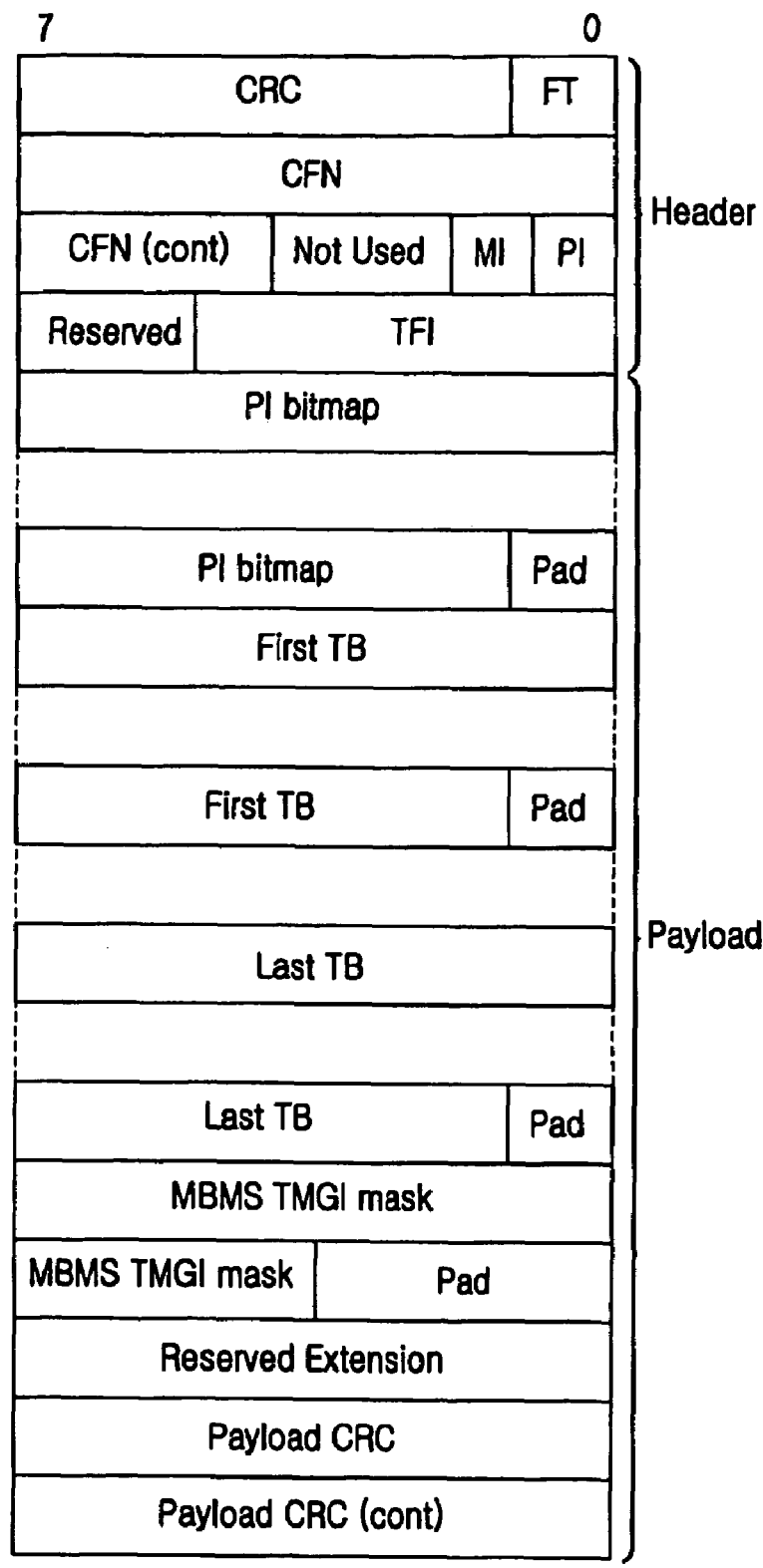
FIG. 11 a diagram of illustrating the PCH IubFP frame structure according to the second scheme.

Refer to FIG. 11, PCH IubFP frame structure of Scheme 2 will be described below, and corresponds to Scheme 2 of PICH frame structure. The scheme is similar to Scheme 1, but the definitions and explanations for each element in the frame structure are different.

Add MBMS Indicator MI bit and MBMS TMGI mask (or called as MBMS TMGI mask) to the PCH IubFP frame structure of this scheme. MI indicates whether there is MBMS TMGI mask in the payload or not. ON account of backward compatibility of the system, MBMS TMGI mask is placed in the extension part of the payload in the frame structure.

MI and MBMS TMGI mask will be described below in detail.

MBMS Indicator (MI)

Description It indicates whether there is MBMS TMGI mask in the payload of frame structure or not.

Value range: {0=the absence of MBMS TMGI mask; 1=the presence of MBMS TMGI mask}.

Field Length 1 bit

Calculation of TMGI mask is described in PICH frame structure that will be described in the following. The mask corresponds to the reserved 12 bits in PICH and occupies the length of 12 bits.

Scheme 3

This scheme corresponds to PICH scheme 3 that will be described in the following. It only adds MBMS Indicator (MI) to the reserved part of PCH IubFP frame structure and does not need to add PI information to the payload. For this situation, after Base Station (Node B) receives PCH IubFP frame from Radio Network Controller (hereinafter referred to as RNC), it only needs to read MI and sets the MBMS PI bit in Scheme 3 of PICH frame structure according to MI's value. According to MBMS PI in PICH frame, User Equipment (hereinafter referred to as UE) determines whether to read MBMS paging message to confirm detailed MBMS service information e.g. TMGI, etc, or not,.

Frame Structure of Paging Indicator Channel PICH

For PICH frame structure, the last 12 bits reserved for future use according to prior art is used by this invention to carry MBMS Service Identity TMGI. There are three kinds of usage modes for these 12 bits.

Following is the detailed descriptions.

Scheme 1

Figure 7:
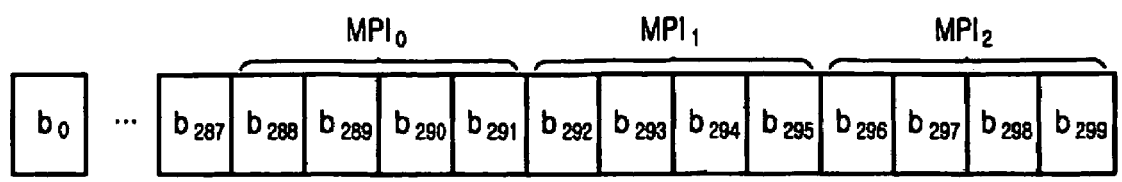
FIG. 7 is a diagram illustrating the MBMS PICH frame structure (Nm=3) according to the first, scheme.

The frame structure of Paging Indicator Channel PICH for Scheme 1 is described below with reference to FIG. 7.

The reserved 12 bits described in Paging Indicator Channel (PICH) can be divided into several groups and each group can be used to represent a MBMS Paging Indicator (hereinafter referred to as MPI). The purpose of dividing these 12 bits into several groups is to page for multiple MBMS services simultaneously to improve paging efficiency.

If the 12 bits are divided into "Nm" groups, each group has 12/Nm bits, in which Nm={1, 2, 3, 4, 6, 12}. The value of Nm can be either fixed or variable. If the value of Nm is variable, UE must obtain current Nm value before RNC performs paging. UE can obtain the Nm value through system information broadcast or other signalling.

Calculation of MBMS Paging Indicator MPI can conform to following methods:

MPI=DRX Index mod Nm, in which DRX Index=TMGI div 8192;

To guarantee reliable transmission, sliding mechanism in existing technology can be deployed:

$$q = \left(MPI + \left\lfloor((18 \times (SFN + \lfloor SFN/8 \rfloor + \lfloor SFN/64 \rfloor + \lfloor SFN/512 \rfloor))mod2) \times \frac{Nm}{12}\right\rfloor\right)modV$$

In the above equation, "q" indicates the actual position of PI in a frame, and SFN is the system frame number, which will change with time. With the change of SFN, the position of MBMS PI, i.e. q, will vary $\lfloor \ \rfloor$ indicates round-off operation and mod indicates modulus operation.

If Nm=1, it is indicated that all 12 bits are in the same group. Then the 12-bit is only used to indication representing the existence of MBMS PI. After UE receives this indication, it needs to continue checking paging message contents to confirm MBMS service that is current paged for.

$P_q$ is used to indicate the value of PI on the position q. If Pq=1, it is indicated that PI is valid and UE shall be woken up to read paging message; if Pq=0, it is indicated that PI is invalid and it is unnecessary for UE to be woken up to read paging message. The bit mapping relation of MBMS paging indicator over PICH is shown in following table (Table 2):

TABLE 1

The mapping relation between MBMS paging indicator $P_q$ and PICH bit: Number of MBMS PIs in 12 bits (Nm)

$P_q = 1$
$P_q = 0$
Nm = 1
$\{b_{288+12q}, \ldots, b_{288+12q+11}\} = \{-1, -1, \ldots -1\}$
$\{b_{288+12q}, \ldots, b_{288+12q+11}\} = \{+1, +1, \ldots, +1\}$
Nm = 2
$\{b_{288+6q}, \ldots, b_{288+6q+5}\} = \{-1, -1, \ldots -1\}$
$\{b_{288+6q}, \ldots, b_{288+6q+5}\} = \{+1, +1, \ldots +1\}$
Nm = 3
$\{b_{288+4q}, \ldots, b_{288+4q+3}\} = \{-1, -1, \ldots -1\}$
$\{b_{288+4q}, \ldots, b_{288+4q+3}\} = \{+1, +1, \ldots +1\}$
Nm = 4
$\{b_{288+3q}, \ldots, b_{288+3q+2}\} = \{-1, -1, -1\}$
$\{b_{288+3q}, \ldots, b_{288+3q+2}\} = \{+1, +1, +1\}$
Nm = 6
$\{b_{288+2q}, \ldots, b_{288+2q+1}\} = \{-1, -1\}$
$\{b_{288+2q}, \ldots, b_{288+2q+1}\} = \{+1, +1\}$
Nm = 12
$\{b_{288+1q}\} = \{-1\}$
$\{b_{288+1q}\} = \{+1\}$ It can be seen from Table 2 that when Pq=1, bits composing the PI shall be all set to '−1' and when Pq=0, those shall be all set to '+1'.

Scheme 2

Figure 8:
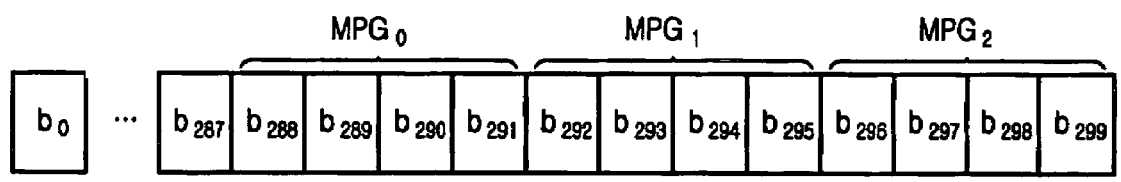
FIG. 8 is a diagram illustrating the MBMS PICH frame structure (m=3) according to the second scheme.

FIG. 8 describes the frame structure of PICH in Scheme 2. In this scheme, 12 bits are divided into several groups called as MBMS Paging Indicator Group (hereinafter referred to as MPG). Each MPG can carry a TMGI mask.

If 12 bits are divided into "m" groups, each group has 12/m bits, in which m={1, 2, 3, 4, 6, 12}. The value of "m" can be fixed or variable. If the value of "m" is variable, UE must obtain current "m" value before RNC performs paging. UE can obtain the "m" value through system information broadcast or other signallings.

If "I" is used to indicate the bit number of each group, then I=12/m. The maximum value of each group n=$2^I$−1.

E.g. if m=3, then I=4, n=$2^4$−1=15.

Calculation of TMGI mask is as follows:

TMGI mask=TMGI mod (n+1);

The group that TMGI locates in is $MPG_i$, wherein, i=TMGI mod m. mod is modulus operation.

For example: if TMGI=59, and m=3,

TMGI mask=59 mod 16=11;

As 59 mod 3=2, this TMGI will be in MPG2.

Figure 9:
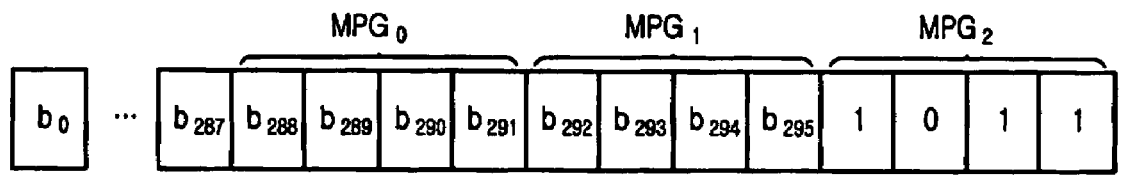
FIG. 9 is a schematic view of illustrating an example for MBMS PICH bitmap.

According to this example, PICH bitmap is as shown in FIG. 9.

Scheme 3 several bits are selected from the reserved 12 bits in PICH frame structure to be used as MBMS PI. After UE that has activated MBMS service reads these several bits of PICH, UE continues to read paging message to acquire and confirm MBMS Service Identity (TMGI) and service information if it finds that MBMS paging are indicated by these several bits.

Multimedia Broadcast/Multicast Service (MBMS) paging message

In order to support service-based MBMS group paging, it is necessary to extract paging messages that can carry MBMS service information. RNC firstly sends paging message to Base Station via PCH IubFP, and Base Station then sends the paging message to UE via SCCPCH. This invention provides two MBMS paging message schemes. One is the modification to the existing "Paging Type 1" message and the other is to design a new paging message called as "MBMS Paging", which are as follows.

Scheme 1

This scheme extends existing "Paging Type 1" by adding MBMS service related information to contents of existing message, whose detailed implementation is:

Add a new entry to Paging Cause of the message, which is called as Terminating MBMS Call.

Add a new entry "TMGT" to UE Identity of the message. Here TMGI is the identity of MBMS service instead of the actual identity of UE.

If radio bearer parameters, such as RB Info, TrCH info, PhyCH Info, Code Information, TFCS, TFCS, Activation time, etc. need to be included in paging message, they can be added into the message. UE establishes corresponding radio resources according to these parameters.

Message can also include other MBMS service related information.

After UE that has activated MBMS service receives paging message, it can check TMGI in the message to confirm whether it is necessary to get ready for the reception of MBMS service or not.

Scheme 2

This scheme gives a new MBMS paging message, which can include information on following several aspects:

Temporary Multimedia Broadcast/Multicast Service Group Identity (TMGI);
Multimedia Broadcast/Multicast Service Identity (MBMS Service ID);
Response Indicator (Response Indicator).

This message includes basic information on paged MBMS service, e.g. TMGI, Service ID, etc. It can also include other information related to the MBMS service.

"Response Indicator" is used to indicate whether it is necessary for UE to prepare for the response to this paging message. If RNC does not need to respond to this paging, it can relieve the overload of uplink signalling.

If it is necessary, the message can also include radio bearer parameters, which include the parameters required for bearing MBMS service, e.g. Radio Bearer Information (RB Info), Transfer Channel Information (TRCH info), Physical Channel Information (PhyCH Info), Code Information, Transfer Format Set (TFS), Transfer Format Combination Set (TFCS) and Activation time, etc. After receiving the paging message, UE can establish corresponding radio resources for MBMS according to RB parameters in the message.

MBMS paging signalling flow

Figure 13:
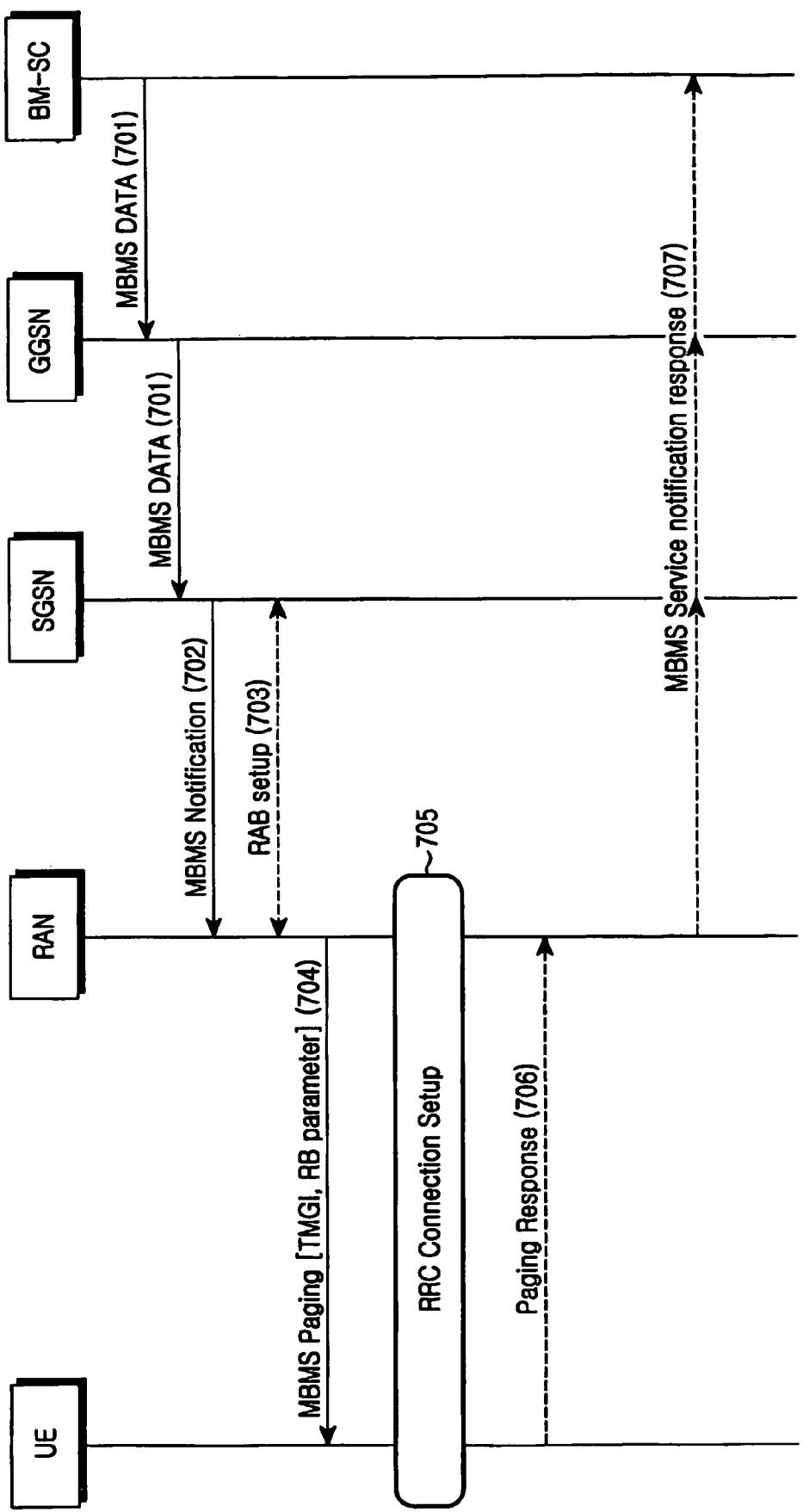
FIG. 13 is a flow chart illustrating MBMS paging signalling process.

FIG. 13 shows the signalling flow of MBMS paging. Each operation step is described below in detail.

701 BM-SC sends data to SGSN via GGSN.

702 SGSN sends "MBMS Notification" to notify UTRAN of TMGI and the service area of current service.

703 Establish RAB between UTRAN and SGSN.

704 UTRAN sends "MBMS Paging" to UE for notifying it that MBMS data will be transferred right away. It is also possible for Radio bearer parameters to be included. If radio bearer parameters are included, UE can establish relevant radio resources and does not need additional radio bearer setup process; otherwise, dedicated radio bearer setup process is needed to establish relevant radio resources.

705 If UE stays in idle mode when receiving paging message, Radio Resource Control (hereinafter referred to as RRC) connection setup process is needed. If UE has been in RRC connection mode, this process is unnecessary.

706 UE sends paging response to UTRAN. If UTRAN does not deal with MBMS paging response, this process can be omitted to reduce uplink signaling according to the requirements of UTRAN.

707 UTRAN sends paging response to BM-SC via SGSN and GGSN. According to the requirements of BM-SC, this message needs not to be sent under some situations.

Figure 14:
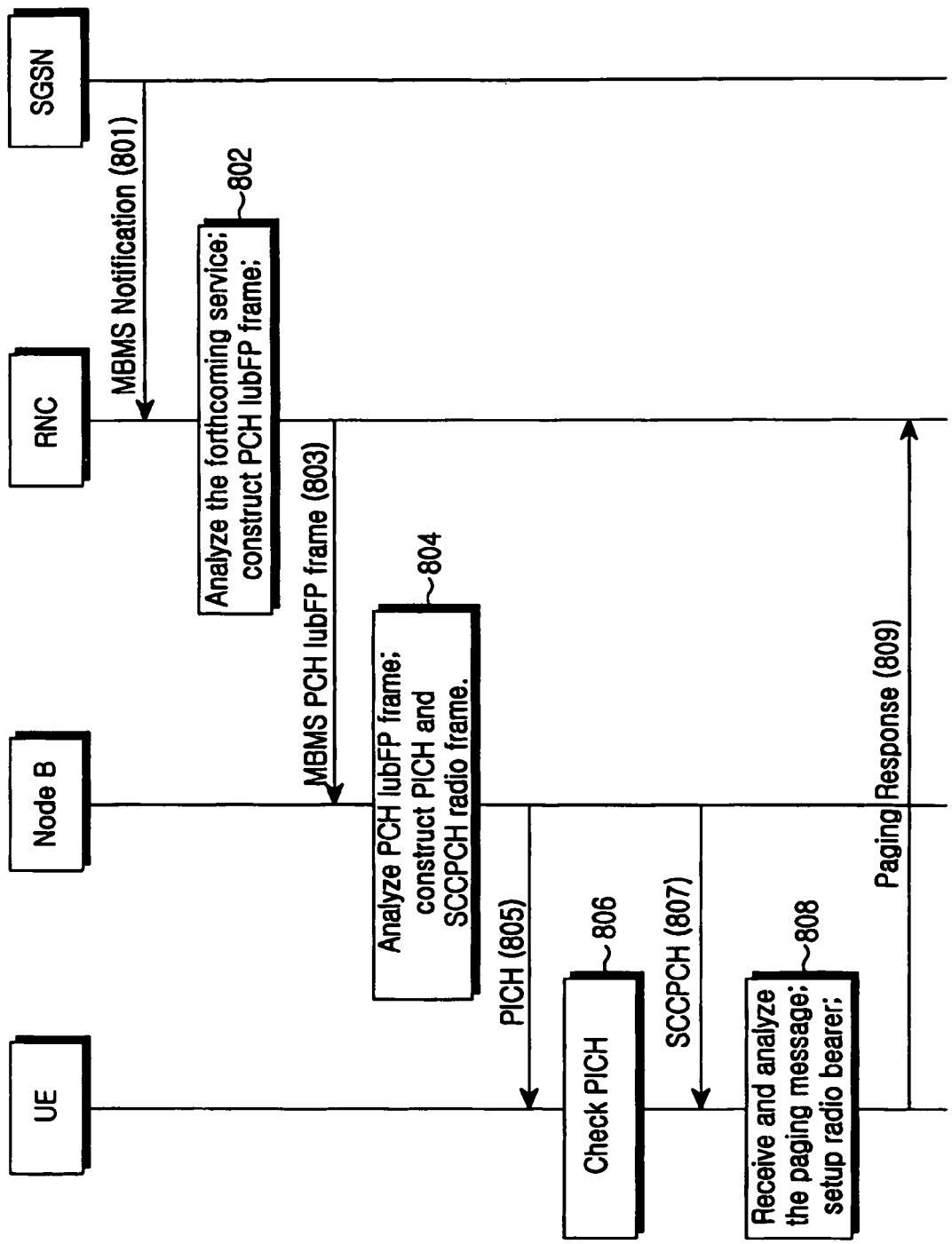
FIG. 14 is a flowchart of UTRAN paging processing.

The flow of MBMS paging processing in UTRAN is described below with reference to FIG. 14.

When RNC receives "MBMS notification" from SGSN at 801, the incoming service is analyzed and PCH IubFP frame is constructed at 802, and then the frame is sent to Base Station at 803.

804 Base Station analyses FP frame, and constructs PICH and SCCPCH. One scheme is that each time when UE wakes up to read PICH, it checks the last 12 bits of PICH. In this case, PICH and SCCPCH shall repeat for a period of time to be received by all users at 805 and 807. Another scheme is that UE obtains a timing clock from the network and only when the clock arrives the fixed time, UE will start receiving MBMS paging.

806 UE checks the last 12 bits of PICH. If the paging service is exactly what it wants, it will start SCCPCH to receive corresponding paging message. After UE analyses the paging message, it will establish radio bearer and sends paging response to RNC if the message is valid.

Figure 15:
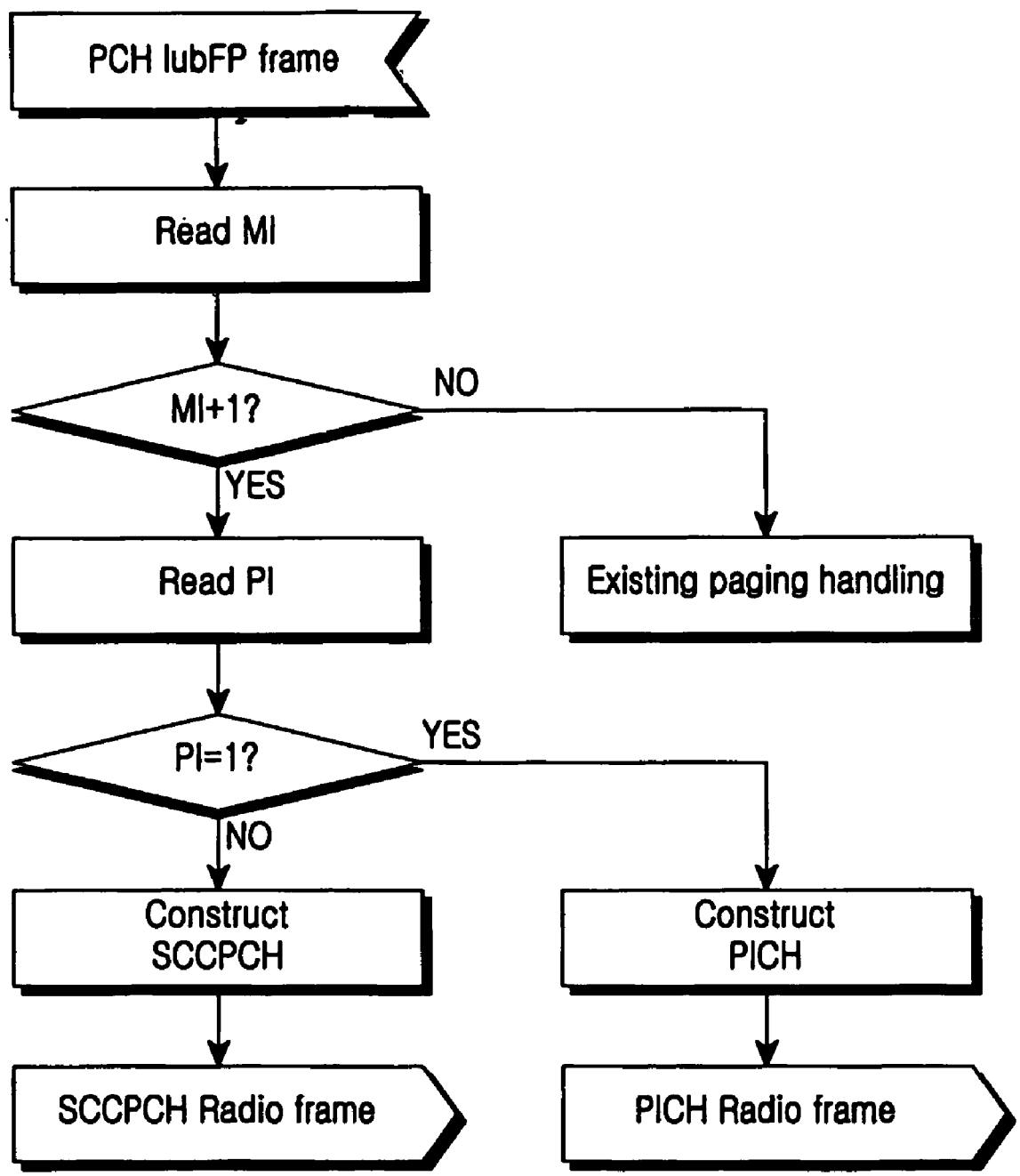
FIG. 15 is a schematic view illustrating the processing of PCH IubFP performed by Node B.

The processing flow of PCH IubFP frame is described below with reference to FIG. 15. Node B firstly examines the MI in PCHIubFP frame structure received. If MI equals 0, it indicates that the PCHIubFP frame belongs to conventional paging and is unrelated to MBMS. Corresponding processing can be performed. If MI=1, it is indicated that the payload of this frame includes MBMS PI bitmap or MBMS TMGI mask. Then after finishing the processing of ordinary paging message, Node B continues to read MBMS PI to construct the last 12 bits of PICH and to read MBMS paging message to construct SCCPCH. At last, Base Station sends PICH and SCCPCH frames which carry PI and paging message for user to read.

Although a preferred embodiment of the present invention has been described for illustrative purpose, those skilled in the art will appreciate that various modifications, additions and substitutions are possible, without departing from the scope and spirit of the invention as disclosed in the accompanying claims.

What is claimed is:

1. A method of paging UEs to provide MBMS service in mobile communication system, the method comprises steps of:
   (a) Broadcast and multicast service center (BM-SC) sending data to Service GPRS Supporting Node (SGSN) via Gateway GPRS Supporting Node (GGSN);
   (b) After Service GPRS Supporting Node (SGSN) receives data from Gateway GPRS Supporting Node (GGSN), it sending MBMS notification to Radio network controller (RNC);
   (c) After RNC receives the notification from SGSN, it organizing the frame according to a paging channel (PCH) Iub frame protocol (FP) according to the notification, wherein the frame includes a MBMS Indicator bit (MI) to the frame of the frame protocol (PCH IubFP), which includes MBMS PI and paging message;
   (d) Radio Network Controller (RNC) sending the frame of frame protocol (PCH IubFP) to Base Station (Node B); and
   (f) Base Station (Node B) transmitting a Temporary MBMS Group Identity (MBMS TMGI) or MBMS Paging Indicator (PI) to by using the last 12 bits of a paging indicator channel (PICH) and Secondary Common Control Physical Channel (SCCPCH) frame that carries paging message for User Equipment (UE).

2. The method as claimed in claim 1, wherein after the step (j), User Equipment (UE) determines whether to send paging response message to the network according to the requirements of the system.

3. The method as claimed in claim 1, wherein in the step (c), the Paging Indicator includes MBMS PI-bitmap, and MBMS Indicator (MI) and the MBMS PI-bitmap are placed in the reserved part and the extensible part of the frame structure of the frame protocol (PCHIubFP) respectively.

4. The method as claimed in claim 1, wherein in the step (c), the Paging Indicator includes MBMS Group Identity mask (TMGI mask) and MBMS Indicator (MI) and the TMGI mask are placed in the reserved part and the extensible part of the frame structure of the frame protocol (PCHIubFP) respectively.

5. The method as claimed in claim 1, wherein in the step (c), the MBMS Indicator (MI) is placed in the reserved part of the frame structure of the frame protocol (PCHIubFP).

6. The method as claimed in claim 3, wherein the reserved 12 bits of the Paging Indicator Channel (PICH) are divided into Nm groups and the number of groups Nm can be either fixed or variable, the value of Nm can be 1, 2, 3, 4, 6, or 12, each group stores a MBMS Paging Indicator (MPI), each Temporary MBMS Group Identity (TMGI) will obtain a MBMB Paging Indicator (MPI), whose calculation method is: MPI=(TMGI div 8192) mod Nm, wherein MPI is the MBMS Paging Indicator represented by each group described, and TMGI indicates Temporary MBMS Group Identity (TMGI), "Div" indicates round-off operation for division and "mod" indicates modulus operation.

7. The method as claimed in claim 4, wherein the reserved 12 bits of Paging Indicator Channel (PICH) are divided into m MBMS Paging Groups (MPG) and the number of groups m can be either fixed or variable, the value of m can be 1, 2, 3, 4, 6, or 12; each group stores a MBMS Group Identity mask (TMGI mask), whose calculation method is: TMGI mask=TMGI mod $(2^{12/m})$, the calculation method for the group position of TMGI mask $(MPG_i)$ in 12 bits is: i=TMGI mod m, wherein TMGI indicates Temporary MBMS Group Indicator, and TMGI mask indicates Group Identity mask, "mod" indicates modulus operation and "i" indicates group position.

8. The method as claimed in claim 5, wherein several bits are selected from the reserved 12 bits of Paging Indicator Channel (PICH) to be used as MBMS Paging Indicator.

9. The method as claimed in claim 1, wherein a new element of "Terminating MBMS Call" is added to the definition of "Paging Cause" of existing paging message "Paging Type 1" and a new element "Temporary MBMS Group Identity (MBMS TMGI)" is added to the definition of "UE Identity" of existing paging message "Paging Type 1".

10. The method as claimed in claim 9, wherein the paging message of "Paging Type 1" includes MBMS Service ID.

11. The method as claimed in claim 9, wherein the paging message of "Paging Type 1" includes Response Indicator.

12. The method as claimed in claim 9, wherein the paging message of "Paging Type 1" includes Activation time.

13. The method as claimed in claim 1, wherein the paging message adopts "MBMS Paging".

14. The method as claimed in claim 13, wherein the "MBMS Paging" message includes MBMS Group Indicator (TMGI) and MBMS Service ID.

15. The method as claimed in claim 13, wherein the "MBMS Paging" message includes Response Indicator.

16. The method as claimed in claim 13, wherein the "MBMS Paging" message includes Activation time.

17. The method as claimed in claim 1, wherein that the radio bearer parameters includes: Radio Bearer information (RB info), Transfer Channel information (TrCH info), Physical Channel information (PhyCH info), Code information (Code info), Transfer Format Set (TFS), Transfer Format Combination Set (TFCS) and Activation time.

18. The method as claimed in claim 1, wherein the Base Station (Node B) determines the frame of the frame protocol (PCH IubFP) as if MI equals to 0, it indicates that the frame of the frame protocol (PCH IubFP) belongs to conventional paging; if MI equals 1, it indicates that the frame of the frame protocol (PCH IubFP) includes MBMS service information.

19. The method as claimed in claim 1, wherein a User Equipment (UE) examines the last 12 bits of PICH and reads the SCCPCH frame to acquire MBMS paging message if the PICH indicate to read the SCCPCH.

20. The method as claimed in claim 1, wherein the paging message received by UE including radio bearer parameters, UE sets up radio bearer.

* * * * *